April 30, 1929. F. B. MacLAREN 1,711,152
CONTROLLING MEANS FOR FUEL FEEDING MECHANISMS
Filed April 1, 1922 2 Sheets-Sheet 1
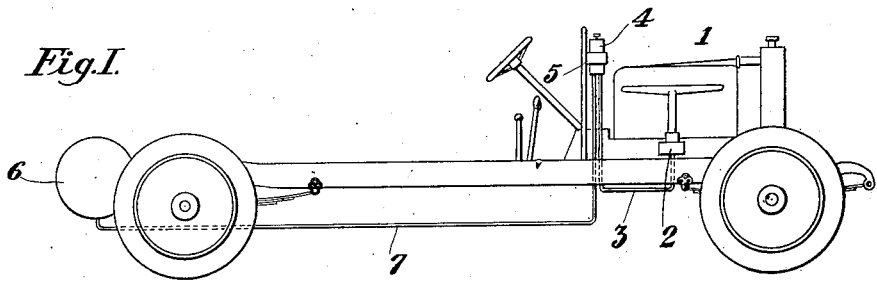
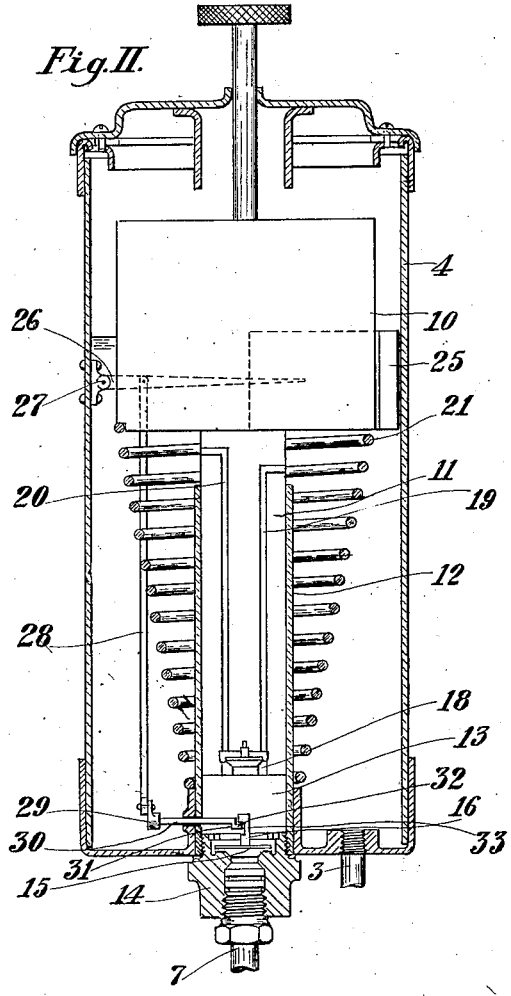
INVENTOR.
Fred B. MacLaren
BY Chester H. Braselton
ATTORNEY.

April 30, 1929.　　F. B. MacLAREN　　1,711,152
CONTROLLING MEANS FOR FUEL FEEDING MECHANISMS
Filed April 1, 1922　　2 Sheets-Sheet 2
*Fig. V.*
*Fig. VI.*
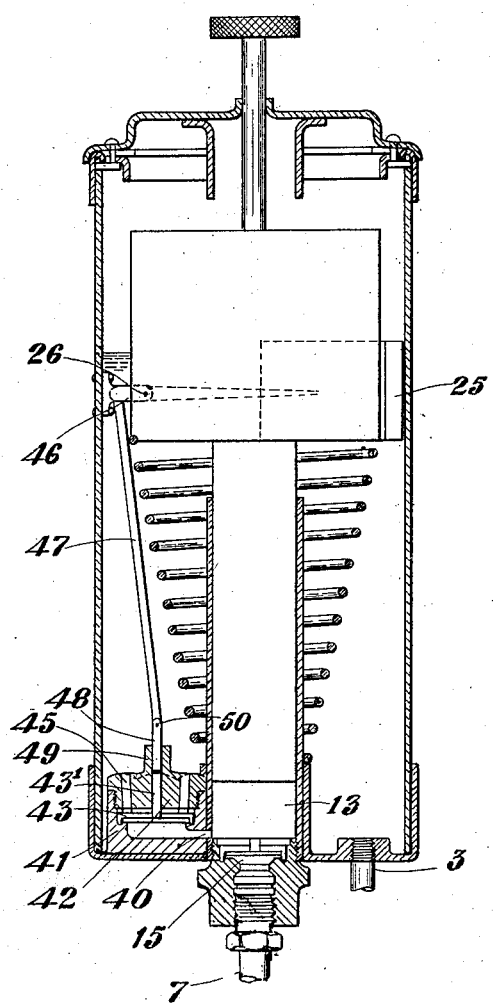
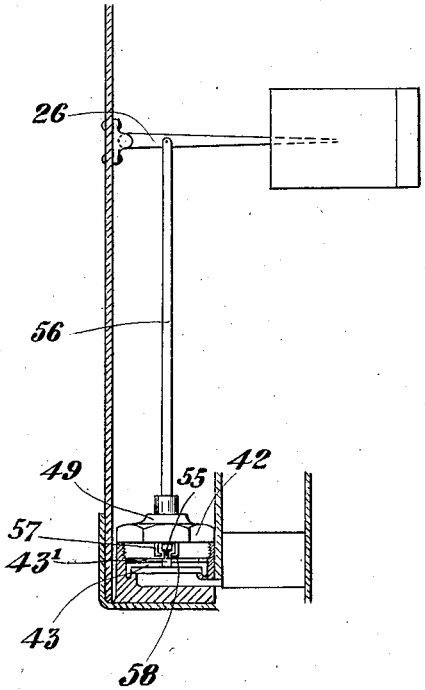
INVENTOR.
Fred B. MacLaren
BY Chester H. Braselton
ATTORNEY Patented Apr. 30, 1929.

1,711,152

UNITED STATES PATENT OFFICE.

FRED B. MacLAREN, OF JAMAICA, NEW YORK, ASSIGNOR TO CHESTER H. BRASELTON, OF NEW YORK, N. Y.

CONTROLLING MEANS FOR FUEL-FEEDING MECHANISM.

Application filed April 1, 1922. Serial No. 548,866.

This invention relates to a system and mechanism for utilizing relative movements of coacting means actuated by vibration for feeding fuel from a supply tank to a fuel consuming means such as the charge forming device of a power plant or an internal combustion engine of automotive vehicles, with means operating to control the feeding action of said fuel supplying means by force multiplying mechanism.

One of the objects of this invention is to provide a fuel supply system for the engine of the automobile in which the vibrations inherent in the automobile are utilized to pump fuel from a supply tank to a secondary tank for feeding therefrom to the engine and in which said pumping action is automatically rendered ineffective or inoperative when the liquid fuel in the secondary tank reaches a certain level, including float operated force multiplying means for rendering ineffective the action of a valve of the pumping mechanism.

In the embodiment of the invention as shown and described I use vibrations which are caused by moving vehicles or vehicles standing still but subjected to vibration by the operation of a driving mechanism or other means, to bring about the lifting of a liquid from a lower level such as the supply tank of an automobile to a higher level tank to be fed to the engine and control the pressure at which said fuel is fed by modifying the pumping mechanism by float control means arranged to effect the operation of a valve of the pumping mechanism and also arranged to permit the normal operation of the valve independently of the float.

Various other objects are within the scope of this invention such as relate to the arrangement of the related elements of the structure, and to various details of construction and to economies of manufacture and numerous other features as will be apparent from consideration of the drawing and related description of a form of the invention, which may be preferred, in which—

Fig. I is a diagrammatic view of the apparatus assembled on a vehicle;

Fig. II is a vertical section of the auxiliary tank and pumping mechanism showing the float operated valve controlling mechanism;

Fig. III is an end elevation of the valve controlling levers of the mechanism shown in Fig. II;

Fig. IV is a view similar to Fig. II of a modification showing the float actuated valve controlling mechanism detached from the tank;

Fig. IV$^a$ is a detailed view of a part of the pump mechanism;

Fig. V is a vertical sectional view of a modified application of the invention to the pumping mechanism and auxiliary tank of the system;

Fig. VI is an elevational view partly in section of a further modification of the invention.

Referring to Fig. 1 of the drawings it will be seen that I have illustrated diagrammatically a motor vehicle having an engine 1 provided with a carburetor 2, a fuel feeding line 3, leading thereto from an auxiliary high level tank 4 supported on the dash 5, a main fuel supply tank 6, located at the rear of the vehicle on a lower level, and a feed line 7 connecting the main tank 6 with the auxiliary tank 4.

Referring to Fig. 2, the tank 4 is illustrated in enlarged section showing one embodiment of the vibration operated means for feeding fuel from the main tank 6 to the auxiliary tank 4. In this particular instance I have illustrated herein a weight 10 connected with a piston plunger 11 reciprocal in the pump cylinder 12 which has a pump chamber 13 at the lower end thereof. The inlet feed pipe 7 is connected with a suitable gasket 14 and provided with a check valve 15 with an upwardly extending valve stem 16, arranged as will hereinafter be described. The piston 11 has a check valve 18 located at the lower end thereof and discharge passages 19 and 20 through which liquid drawn into the pump chamber 13 may be discharged into the tank 4 upon the downward stroke of the piston 11. The weight 10 is spring supported by the spring 21 as shown and it will be understood that upon the tank and the pumping mechanism being subjected to vibration due to the difference in inertia of the parts, that the pump piston 11 will be reciprocated in the pump cylinder 12.

The means illustrated herein for disabling one of the valves in the valve pumping mechanism is shown as including the float 25, which may be in the shape of a semiannular member in order to conveniently fit between the weight 10 and the wall of the tank 4, at a considerable height from the bottom of the tank. Connected with the float 25 is a lever 26 pivoted to the tank at 27 and pivoted to the lever 26 is a downwardly extending rod 28 connected by a link 29 at its lower end with a shaft 30, adapted to be oscillated by the rod 28, the lever 26 and float 25 to raise the check valve 15 off its seat. To this end the shaft 30 extends into the pump cylinder 13 and is provided with a crank 31 which has an offset lip 32, adapted to engage in a notch 33 in the valve stem 16 as shown. In order to permit the normal operation of the valve 15 without interference by the valve disabling means, the notch 33 in the valve stem 16 is elongated as shown so that when the valve is in lowered position the same may oscillate without contact with the lip 32.

The operation of the mechanism will be understood from the foregoing. It will be seen that in use the liquid is drawn through the inlet pipe 7 to the pump chamber 13 and discharged by the pump 11 through the passages 19 and 20 into the tank 4, whence it may flow through the pipe 3 to the carburetor 2 of the engine. When the height of the liquid in the tank 4 contacts with the float 25 the float is raised into the position shown in Fig. II, raising the rod 28 through the force multiplying means in the lever 26 to rotate the shaft 30 to such an extent that the lip 32 on the crank 31 thereof contacts with the upper edge of the notch 33 and lifts the valve 15 entirely off its seat and holds the same in raised position.

It will be seen therefore that effective means are provided for rendering ineffective the pumping action of the pumping mechanism by disabling one of the valves thereof and that this is accomplished by force multiplying means in the particular embodiment disclosed herein.

Moreover attention is called to the fact that the valve disabling means is not operated in turn by the valve action in the normal operation of the pumping mechanism so that no added duty is imposed upon any valve in the normal operation of the mechanism.

In the modification of the valve disabling mechanism shown in Fig. IV the shaft 30 is provided at its inner end with a cam 35 which, when the float 25 is raised by the liquid in the tank 4, is turned downward to engage the valve stem 16 and hold the valve 15 against its seat in the gasket 14 holding the same in closed position in contradistinction to the action of the mechanism shown in Fig. II which holds the valve open.

It will be noted that in each of the embodiments illustrated in Figs. II and IV that the disabling means is applied to the inlet valve for the pump cylinder 13. In Figs. V and VI I have illustrated an embodiment of the invention applied to the discharge valve of the pump mechanism. In this instance the valve chamber 13 is provided with a discharge passage 40 terminating in a valve casing 41 which may be made, if desired, integral with the bottom of the tank 4. The valve casing 41 is provided with a suitable valve seat with which co-operates a check valve 43. As the inlet pipe 7 is connected with the pump chamber 13 through the inlet check valve 15 as in the other embodiments of the invention it will be seen that the two valves 15 and 43 constitute the essential valve operating parts of the liquid pumping mechanism. Suitable passages 45 through the plug 42 permit the fuel to be fed from the valve chamber in the casing 41 to the tank 4. The liquid fuel is fed from the tank 4 to the carburetor through the outlet pipe 3 as will be understood.

In the embodiment illustrated in Fig. V the float 25 is connected by the lever 26 to operate on a reciprocable control rod 47, the lever 26 being fulcrumed on a bracket 46 at a point between the float and the control rod 47 and adjacent the latter. This control rod extends downwardly and is provided with a reciprocating stop member 48 adapted to slide in an upwardly extending bearing 49 on the valve plug 42. The sliding stop 48 and rod 47 are pivotally connected at 50 to permit rectilinear vertical reciprocation of the stopping member 48, notwithstanding the direction of movement of the rod 47. The valve 43 is provided with a valve stem 43' of such length as to extend upwardly through a suitable opening in the top of the valve plug 42 which is in alinement with the bearing 49 for the sliding stop 48. The relative lengths of the members 48 and 43' are such that in normal operation the valve stem does not contact with the stop 48. Upon a rise of fuel in the tank 4 the float 25 is raised and the rod 47 is moved downwardly through the compound lever connections 26 and 46. This moves the reciprocating stop 48 downwardly to contact with the upper edge of the valve stem 43' to hold the valve 43 downwardly against its seat.

It will thus be seen that in the embodiment of Fig. V, a float operated means or means dependent upon the amount of liquid fed by the pumping mechanism through suitable force multiplying means operates to disable one of the valves of the pumping mechanism.

In Fig. VI, a further modification of the invention is disclosed which corresponds to the arrangement illustrated in Fig. 5, but operates to lift the valve 43 and hold the same from its seat. In this instance the valve stem 43' is provided with an elongated reduced portion 55 corresponding to the elongated notch 33 in the valve stem 16 of the valve 15 in the modification shown in Fig. II. In Fig. VI the lever 26 is connected with a rod 56 which slides through the bearing opening 49 in the top of the valve plug 42 and carries at its lower end downwardly extending fingers 57, provided with lips 58 for engagement in the recessed portion 55 of the valve stem 43'. The operation of the embodiment illustrated in the Fig. VI is similar to that of the mechanism shown in Fig. V with the exception that as the float 25 rises the lever 56 eventually comes in contact with the overhanging ledge at the upper portion of the valve stem 43' and raises the valve 43 off its seat, preventing further action of the valve as the pump continues to be oscillated. It is apparent that in both of the illustrations of Figs. V and VI, the valve disabling means is arranged so that in the normal operation of the valve 43 the float 25 and connecting lever mechanism are not actuated thereby.

It will be apparent that other means than the float 25 may be employed to effect an action of the valve disabling means which other means may be, however, dependent upon the height of the liquid in the tank or the pressure of the same as fed to the carburetor 3, or upon the amount of liquid being fed from the main supply tank 6.

It is apparent that, within the spirit of the invention modifications and different arrangements may be made other than as herein disclosed, and the present disclosure is illustrative merely; the invention comprehending all variations whether illustrated or not.

Having thus described my invention, what I desire to secure by Letters Patent of the United States and claim is:

1. A fuel supply system for internal combustion engines, comprising a fuel supply tank, means including a weighted element adapted to be operated by vibration for pumping liquid fuel from the supply tank for the engine, and automatic means for rendering the pumping means ineffective, including a float, an element for engaging and preventing effective movement of a valve of the pumping mechanism and lever mechanism operatively connected between said float and said element.

2. A fuel supply tank for internal combustion engines comprising a casing having an outlet port, pumping mechanism positioned within the casing including a cylinder, a piston movable within the cylinder having a valved outlet to the cylinder and a spring held weighted member attached to the piston for causing reciprocation thereof when the casing is reciprocated; and means for retaining effective pumping action of the pump mechanism comprising a float pivotally mounted within the casing, and lever connections from said float to one of the valves of the pumping mechanism, operative to engage said pump valve and restrain movement thereof when the supply of liquid in the casing exceeds a predetermined quantity.

In testimony whereof, I affix my signature.

FRED B. MacLAREN.